Feb. 21, 1939.  F. F. PARIS ET AL  2,148,171
DITCH DIGGER
Filed Sept. 22, 1937
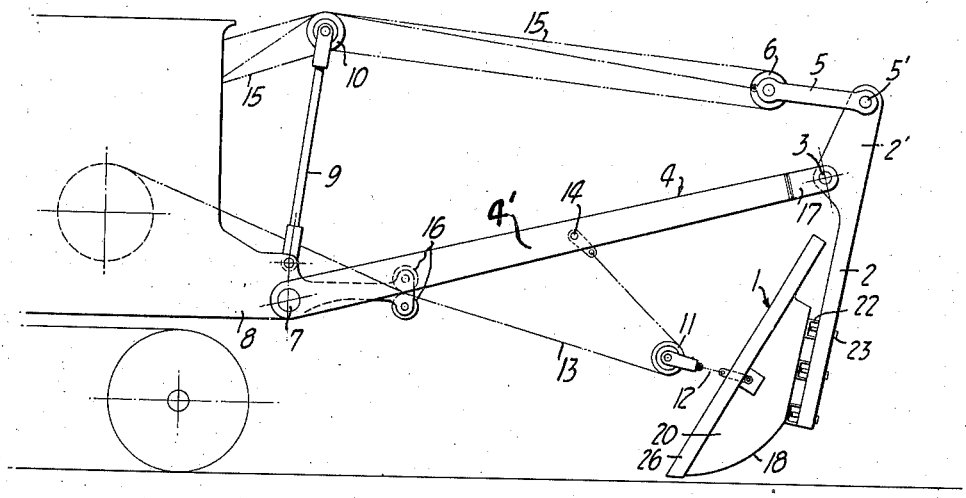
FIG_1_
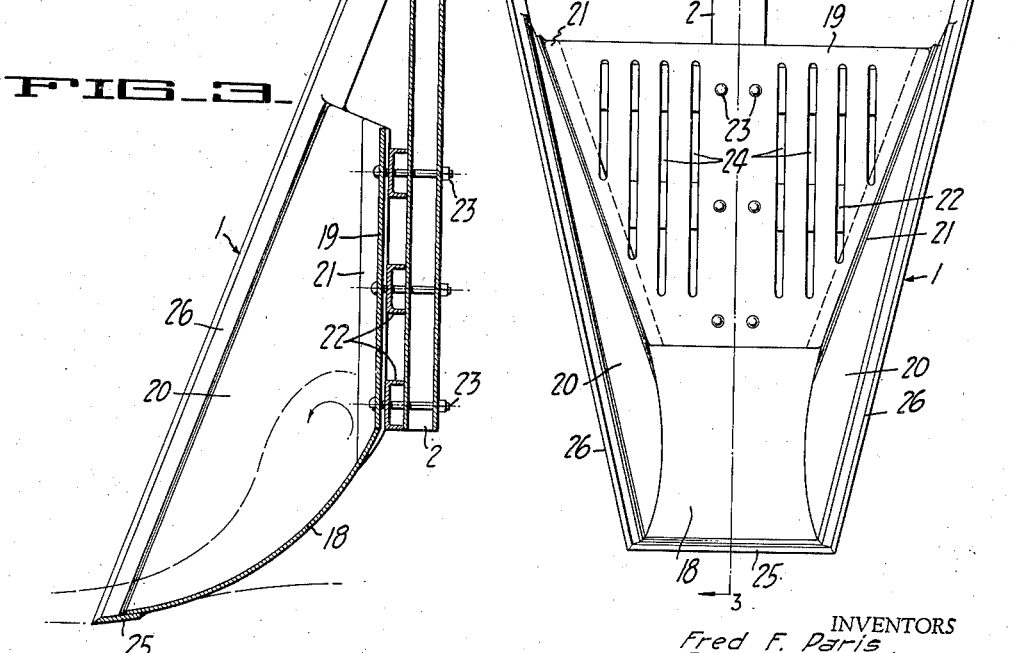
FIG_2_
FIG_3_
INVENTORS
Fred F. Paris
Roy L. Kerns
BY
Boykin & Mohler
ATTORNEYS Patented Feb. 21, 1939

2,148,171

UNITED STATES PATENT OFFICE 2,148,171

DITCH DIGGER

Fred F. Paris, Berkeley, and Roy L. Kerns, Rio Vista, Calif.

Application September 22, 1937, Serial No. 165,088

6 Claims. (Cl. 214—138)

This invention relates to ditch diggers of the type having a boom mounting the scoop for swinging of the scoop thereon and in which the boom is pivotally mounted on a tractor.

The objects of the invention are to provide an improved scoop in ditch diggers of the above type, constructed to be self-cleaning, particularly where digging in clay or sticky soil, and which scoop is also constructed to more efficiently dig ditches than heretofore with a minimum of frictional resistance with the ground while cutting into the soil. Other objects and advantages will appear in the specification and drawing annexed hereto.

In the drawing,

Fig. 1 is a side elevational view of our invention with only a portion of the tractor showing.

Fig. 2 is an enlarged front elevational view of the scoop.

Fig. 3 is a sectional view of the scoop as seen along line 3—3 of Fig. 2.

In detail, our scoop, generally designated 1 (Fig. 1), is bolted to the lower, outer end of an arm 2, which arm is pivoted at 3 adjacent its upper end to the outer end of a boom 4, the arm projecting at 2' beyond the boom at the side of pivot 3 opposite arm 2. A relatively short link 5 is pivotally connected at 5' at one end to the extreme outer end of arm 2' and a sheave 6 is rotatably mounted on the opposite end of link 5.

The inner end of boom 4 is pivoted at 7 to the frame 8 of a tractor, the frame preferably being rotatably mounted on the tractor for swinging the boom around the vertical axis in the conventional manner while permitting raising and lowering the boom on pivot 7 as described. On frame 8 is an upwardly projecting post or frame 9, on the upper end of which is a sheave 10, and a sheave 11 is secured to the scoop 1, as by a chain or cables 12.

A suitable cable 13 secured at 14 to the boom, extends over sheave 11 to a suitable power driven winding drum on the tractor, and cables 15 extend over sheaves 6 and 10 and also extend to a suitable power driven winding drum on the tractor.

Thus actuation of cables 15 will raise the outer end of the boom and will also cause the scoop to be thrown outwardly preparatory to digging; and actuation of cable 13 will swing the scoop for digging and for loading said scoop, and after the cut is made, the loaded bucket is readily swung with the boom on the vertical axis mounting frame 8, to a position for unloading the bucket. The operations described are more or less conventional, and the operation will be clear to anyone familiar with the art without a more detailed disclosure of the winding drums, cables, etc. It may be noted, however, that we preferably pass cable 13 through a fair-lead 16 mounted on boom 4 adjacent the inner end of the latter.

The boom 4 is preferably of generally Y form, with the leg adjacent pivot 3 and the diverging arms 4' connected respectively by the pivot 7 to the frame. Thus the fair-lead is between the arms 4' and a single cable 13 is all that is required to swing the bucket. In actual construction the arms 4' are each separately fabricated from a channel beam with a plate extending across the open side and welded at its edges to the free edges of the channel, and the leg of the boom is formed by continuations 17 of the arms 4', which continuations are spaced to receive the arm 2 therebetween with the pivot 3 passing through the continuations and the arm.

The scoop itself is of particular importance and comprises a bottom 18 which is curved in one dimension from its forward free edge rearwardly in a relatively flat arc, the rear free edge joining a flat back plate 19, said back plate being disposed almost tangentially relative to the arc of the curved bottom. Sides 20 extending upwardly from the bottom 18 and back plate 19 are disposed in planes diverging from the bottom and back plate and which sides also are divergently arranged from the forward end of the bottom 18 rearward. The sides 20 are curved at their lower edges to conform to the curve of the bottom 18, and are preferably welded at their lower edges to the curved side edges of the bottom and to the vertically extending arms of straight angle-irons 21 which angle irons extend along the straight back plate 19, the other arms of each of the angle irons 21 extending horizontally toward each other. A plurality of cross members 22 of channel form are welded at their ends to outer or lower sides of the horizontally extending arms of angle irons 21, which channels have their open sides disposed outwardly and the flat outer side of the bottoms thereof facing into the scoop. The back plate 19 is supported against said flat outer sides of the cross members 22 and are bolted thereto by bolts 23 that also extend through the lower end of arm 2.

We preferably form the back plate 19 with a plurality of relatively narrow slots or openings 24, for the purpose of allowing any water that may enter the scoop to rapidly drain therethrough during the digging operation.

Along the forward free edge of bottom 18 of the scoop is a cutting blade 25 projecting forwardly of said edge and disposed substantially in the same plane as the forward marginal edge of the scoop, which blade is beveled along its forward edge to form an advance cutting edge substantially in the plane of the outer surface of the blade, and the sides 20 are likewise provided at their outer sides along their upper edges with cutting blades 26 disposed in planes similar to the planes of the sides, said blades 26 projecting upwardly from the upper edges of the sides and beveled along their upper free edges on the sides thereof generally facing toward each other so as to form cutting edges substantially even with their outer surfaces. The blade 25 is welded to the bottom 18 and blades 26 are welded to the sides, and blade 25 and blades 26 are welded to each other at their adjacent ends, thus forming a generally U-shaped cutting edge around the scoop.

The scoop as above described and in combination with the pivoted arm 2 is adapted to cut a ditch in the earth without any portion of the scoop, other than the cutting edges, engaging the earth to be cut. The rounded bottom, as described, insures against the bottom engaging the bottom of the ditch at any point during movement of the scoop, whereas in those scoops having a relatively deep and angular rear corner they engage the bottom of the ditch rearwardly of the cutting edge on the scoop bottom on the upswing of the scoop during digging, to prevent effective digging of the forward cutting edge of the bottom. Also by curving the bottom of the scoop to substantially arcuate form throughout its length, as by disposing the back plate 19 in a plane substantially tangentially of the arc of the bottom 18, the earth entering the scoop will effectively "scour" the bottom with each operation, thus preventing any lodgment of sticky material such as clay within the scoop. In Fig. 3 the movement of the earth in entering the scoop is illustrated, in dotted line, as being at all times pushed across the bottom rearwardly to make the bottom self-cleaning.

Another feature of the scoop is the fact that the spacing between the sides 3 is progressively larger from the front end of the scoop rearwardly, so that material entering the scoop at the forward edge freely moves rearwardly within the scoop into a progressively increasing area.

It is, of course, obvious that the bottom of the scoop may be of a continuous arc throughout its length, with the back plate 19 integral with the bottom 18, but this would complicate the method of securing the arm 2 to the scoop. Also, while the cutting blades may be made integrally with the sides, it is preferable to make said blades of tempered steel and the body of the scoop of lighter gauge metal.

Having described our invention, we claim:

1. In ditch digging apparatus, a scoop having opposed side walls of similar size and shape, a bottom wall extending between the side walls at one of their edges and the side of the scoop opposite the bottom wall being open, said bottom wall being provided with a cutting edge along one of the edges thereof extending between said side walls, the free edges of the side walls along the open side of the scoop extending divergently from points adjacent opposite ends of said cutting edge, said side walls being disposed in planes extending convergently from said free edges to the bottom wall, and means mounting said scoop for swinging the scoop in a vertical plane with its cutting edge in position for cutting into the earth during swinging thereof and for causing the cut earth to pass over the bottom wall into the scoop, said bottom being curved in a direction away from said cutting edge with the concave side thereof facing toward said open side, and the diverging free edges of said side walls being provided with sharpened cutting edges.

2. In ditch digging apparatus, a scoop having opposed side walls of similar shape and size, each of said side walls being curved along one edge and straight along the opposite edge with the curved edge intersecting the straight edge at one end of the side wall, a bottom wall connecting along opposite edges thereof with the curved edges of the side walls and having a straight edge extending between points on the side walls adjacent the ends of the side walls where the curved edges of the latter intersect the straight edges thereof, the side of the scoop along said edge of the bottom plate and said straight edges of the side walls being open, said edge of the bottom wall and said straight edges of the side walls being provided with cutting blades secured thereto, said blades being sharpened along one of their edges to form cutting edges facing outwardly of the scoop and the side walls of said scoop being disposed in planes extending divergently from their edges that connect with said bottom and from their ends adjacent the cutting blade along one edge of the bottom, a rigid arm secured at one end to said scoop and extending outwardly of the scoop from the end thereof opposite the cutting blade on said bottom, means mounting the opposite end of said arm for swinging the scoop in an arc in a vertical plane and means for raising and lowering said scoop relative to the ground.

3. In a construction as defined in claim 2, said bottom wall including a flat plate extending from a point intermediate the opposite ends of the side plates toward the ends thereof opposite the ends that are adjacent said straight edge of the bottom wall.

4. In a construction as defined in claim 2, said bottom wall including a flat, perforated plate separable from the scoop in a position extending from a point intermediate the opposite ends of the side plates toward the ends thereof opposite the ends that are adjacent said straight edge of the bottom wall, and means removably securing said plate in said position.

5. In ditch digging apparatus, a scoop having opposed side walls of substantially similar size and shape, a bottom wall extending between the side walls at one of their edges, the side of the scoop opposite the bottom wall being open and the side of the bottom wall facing toward said open side of the scoop being generally concave in the direction of the length of the bottom, said bottom wall being provided with a cutting edge along one of the edges thereof extending between said side walls, the free edges of the side walls along the open side of the scoop extending divergently from points adjacent opposite ends of the said cutting edge and said side walls being disposed in planes extending divergently from said free edges to the bottom wall whereby earth passing into the scoop over the cutting edge will pass onto said bottom and into a progressively enlarged area between said side walls.

6. In a construction as defined in claim 5, the diverging free edges of said side walls being provided with sharpened cutting edges.

FRED F. PARIS.
ROY L. KERNS.